Oct. 14, 1969 T. A. CONANT, JR 3,473,163

CLOCK TRACK RECORDER

Filed Jan. 20, 1966 2 Sheets-Sheet 1

FIG. I

INVENTOR.
THEODORE A. CONANT JR.
BY Joseph R. Dwyer
ATTORNEY

INVENTOR.
THEODORE A. CONANT JR.
BY Joseph A. Duza
ATTORNEY

United States Patent Office 3,473,163

Patented Oct. 14, 1969

3,473,163

CLOCK TRACK RECORDER

Theodore A. Conant, Jr., Sylmar, Calif., assignor to General Precision, Inc., a corporation of Delaware Filed Jan. 20, 1966, Ser. No. 521,783
Int. Cl. G11b 5/02
U.S. Cl. 340—173 12 Claims

ABSTRACT OF THE DISCLOSURE

A pulse generator controlled by a pre-recorded memory clock which may contain phase variations and closure errors and which generates output signals free from such errors. At the end of the desired pulse length, the circuit develops short pulses which are AND gated with the next pre-recorded input pulses to generate desired output pulses. If an input pulse fails to appear when the developed "allow change" pulse occurs, the circuit instantly produces a "forcing" pulse which generates the desired output pulse.

Figure 1:
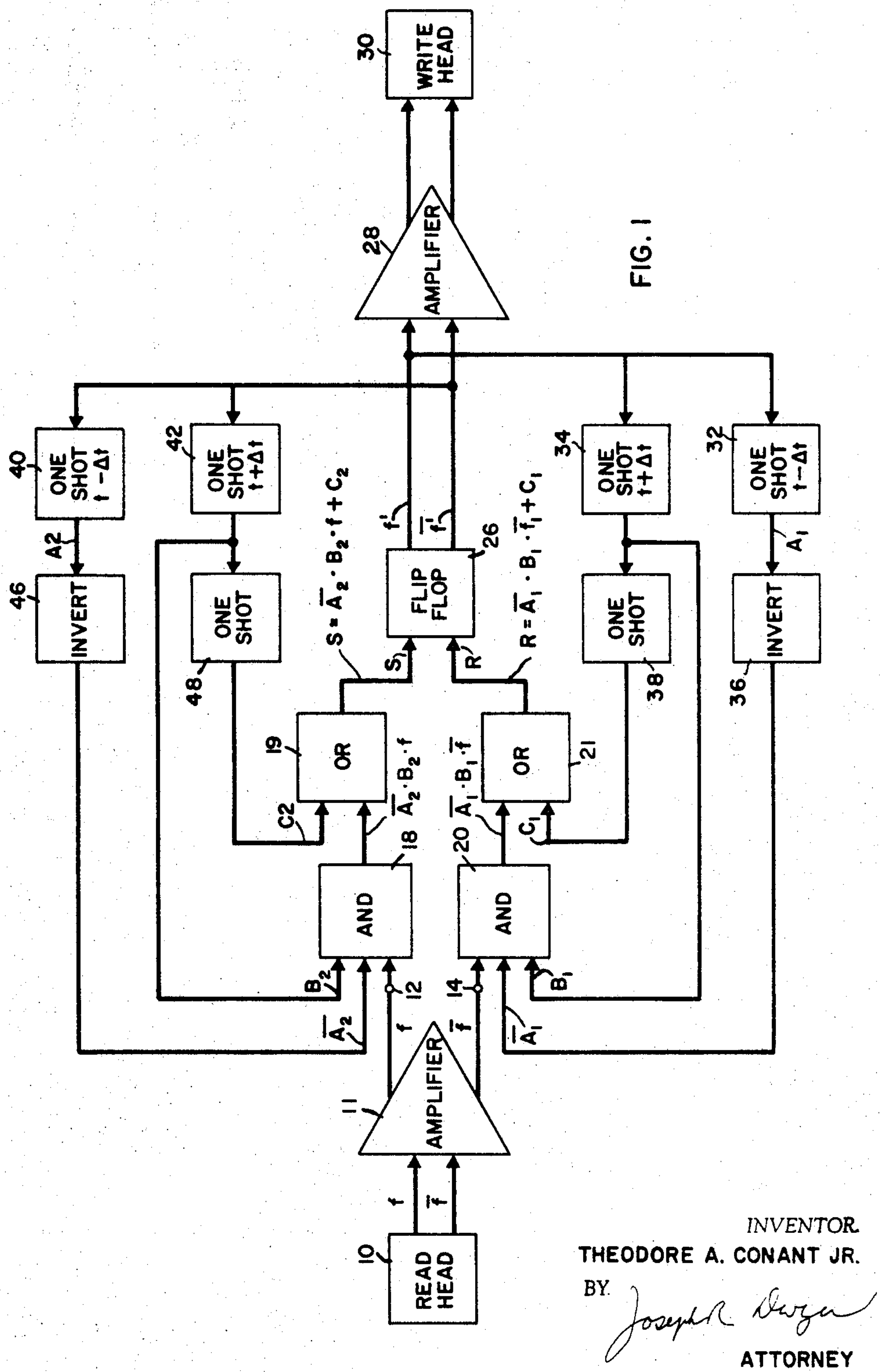

This invention relates to a frequency converter, and more particularly to a novel and improved frequency converter for converting a signal pulse which has a frequency error, such as cyclic-to-cyclic variations in time, or the like, into signal pulses which have a frequency that is the real time average of the number of pulses of the original signal.

Briefly described, the present invention provides means for sensing a signal which may have cyclic-to-cyclic variations in time due to random variations, such as high frequency modulation, or non-random variations due to closure error, and especially wherein the pulses are of different variations. If a signal is recorded upon a memory media, such as a rotating recording drum disc, or the like, wherein the correct number of pulses may be recorded thereon to indicate the desired number of bits in any one clock track, the above-mentioned high frequency modulation and the closure error are normally present. Closure error is defined as an error which occurs when the last cycle of a clock frequency recorded upon a memory media fails to meet the original starting cycle, thus providing a wider or narrower clock pulse on the closure. By this invention means are provided to take the already recorded signal from a specific clock track and re-record the frequency average of that signal upon another track on the same memory media, or the like.

It, therefore, becomes one object of this invention to provide a frequency converter capable of recording a clock track upon a memory media with a minimum of frequency modulation and a minimum of closure error.

Another object of this invention is to provide a frequency converter capable of recording a clock track upon a memory media with cyclic signals supplied from a previously recorded signal upon the same memory media, but from a different track and recording a closure error-free signal without cycle-to-cycle variations.

Figure 2:
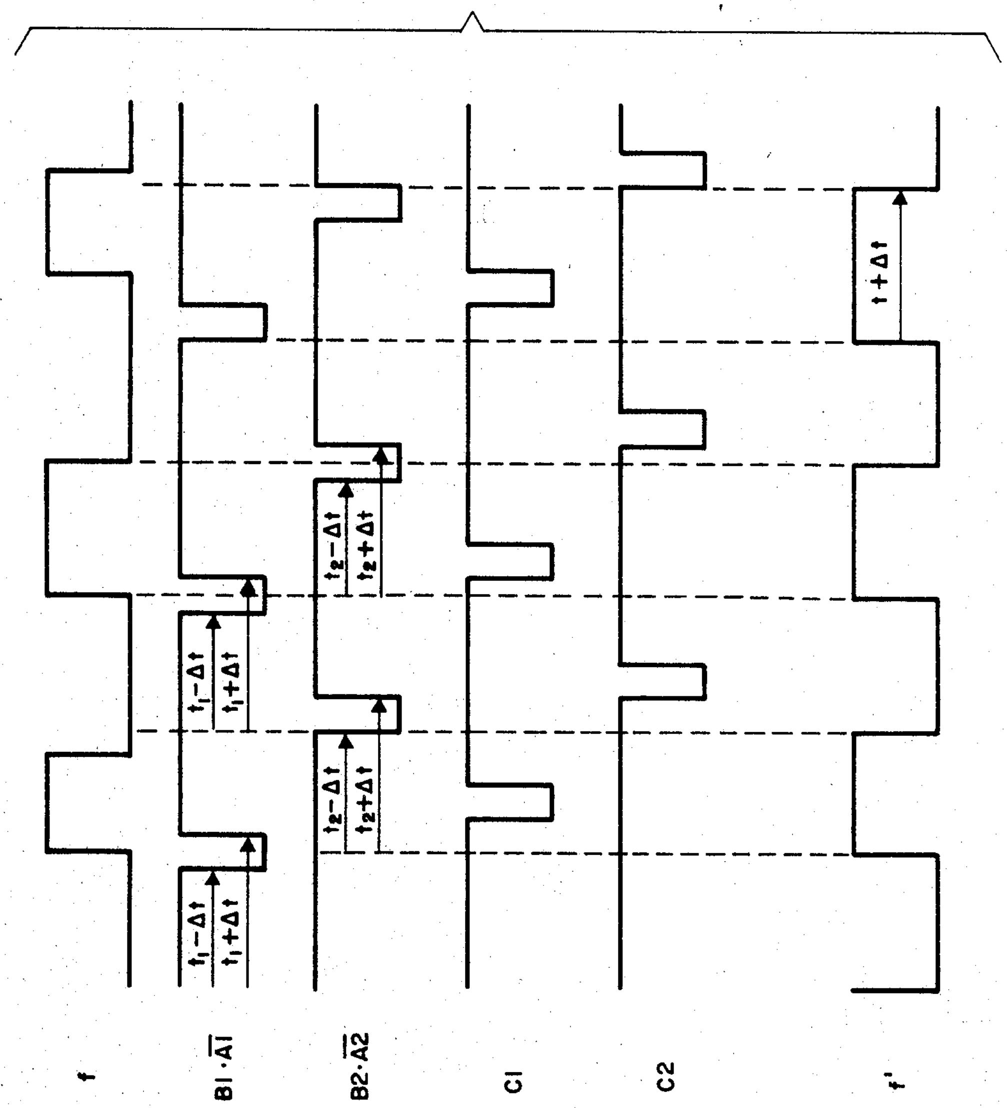

In the drawings, which illustrate one embodiment of this invention:

FIGURE 1 shows a logic diagram illustrating one preferred embodiment of the invention, and FIGURE 2 is a graphic illustration of pulse shapes used in connection with the operation of the preferred embodiment of the invention shown in FIGURE 1.

Turning now to a more detailed description of this invention, there is shown in FIGURE 1 a read head 10 which is used to detect a specific frequency and present outputs designated by the term $f$ and the complement thereof $\bar{f}$. The signal detected by the read head may be one which is recorded upon a memory media, such as a disc, drum, or the like, and being one which is cyclic in nature and can be recorded thereon by any one of the conventional known techniques, specifically, an oscillator which may, for instance, have a frequency variation of less than 10% and may have a greater frequency variation in its closure. A requisite for this invention for recording a clock track is that the frequency has the correct number of pulses recorded upon the memory media and that number of pulses can be referred to hereafter as the term $n$. These signals are then applied to a sense amplifier 11 wherein both signals $f$ and $\bar{f}$ may be amplified by the amplifier 11 and presented to terminals 12 and 14.

As pulses appear in read head 10 and are presented to the read amplifier 11, the outputs therefrom are presented to AND gates 18 and 20, respectively. The output of AND gate 18 is presented as one of two functions to OR gate 19 and, likewise, the output of AND gate 20 is one of two input functions to OR gate 21. The output of OR gate 19 is presented to the S terminal of a bistable member such as an RS flip-flop 26. Meanwhile, the output of OR gate 21 is presented to the R terminal of flip-flop 26. The output functions of the flip-flop 26, designated by the term $f'$ and $\bar{f}'$, are presented directly to a write amplifier 28, which in turn is presented to write head 30 which can then be used to re-record signals on the memory media.

It can be seen that the signals that are read by read head 10 will be picked up from one particular track of the memory media and re-recorded by this invention upon a different track on that same media through write head 30 whereby the newly recorded signal, as will be shown, is a smoother frequency having negligible closure error and with less cycle-to-cycle variations in the frequency. The output from flip-flop 26, designated $f'$, is also presented to a pair of monostable vibrators 32 and 34, hereinafter referred to as "one shots," and the output of one shot 32 is designated by the term A1 and is presented to an inverter 36. The output from inverter 36 is designated $\overline{A1}$ and is presented as a second input function to AND gate 20. The output of one shot 34 is designated by the term B1 and presented as the third input function to AND gate 20, and, therefore, if the functions $\bar{f}$, $\overline{A1}$ and B1 are present, AND gate 20 will be enabled and present an output function designated as the term $\overline{A1}\cdot B1\cdot\bar{f}$ which output is fed directly as one of two inputs into OR gate 21. The output of one shot 34 is also presented to one shot 38 and the output therefrom is designated as C1. This output C1 is one of two input functions presented to OR gate 21, thus the output function from OR gate 21 and presented to the R input of flip-flop 26 is $$R=\overline{A1}\cdot B1\cdot\bar{f}+C1$$

Monostable vibrators, herein referred to as one shots, are the type which produce a pulse signal on the leading edge of any input signal; this signal provided from the one shots is of a specific time duration that may be determined by an RC time constant contained therein. Such one shots and their operation are well known in the art. The RC time constant of the one shots in this invention is of a time duration that produces a pulse width designated by the term $t$, and thus $t$ of one shot 32 may be designated by the following: $t-\Delta t$, wherein $\Delta t$ being some change in the time. Therefore, $t-\Delta t$ would be a time duration $<f$. The output of one shot 34 is $t+\Delta t$, which means that the output 34 or the signal B1 is a pulse width with $t>f$.

The output from flip-flop 26 designated $\bar{f}'$ is presented to a pair of one shots 40 and 42 and the output of one shot 40 is designated by the term A2 and has a time constant therein of $t-\Delta t$. The output A2 of one shot 40 is presented to an inverter 46 which inverts the term A2 and presents it to AND gate 18 as the term $\overline{A2}$. The output from one shot 42 which has a time constant of $t+\Delta t$, designated as the term B2, is presented to the AND gate 18 as another function of that gate. The output of one shot 42 is also presented to a one shot 48 and the output of one shot 48 is designated by the term C2 and is presented as the alternate function to OR gate 19.

The output of AND gate 18 is designated by the function $\overline{A2}\cdot B2\cdot f$, and the output of OR gate 19 is presented to flip-flop 26 at the terminal designated S and is designated as the following term: $S=\overline{A2}\cdot B2\cdot f+C2$.

The time durations of one shots 38 and 48 may be some signal which presents a small pulse, and for the sake of this invention can be designated as a difference between $t+\Delta t$ and $t-\Delta t$ and will hereinafter be referred to as the "force pulse" and the output from AND gates 18 and 20 will be designated as "allow change pulses."

Referring now to graphs shown in FIGURE 2, the signal $f$ is illustrated to show a typical waveform that may be recorded upon a memory media. The "allow change pulses" $B1\cdot\overline{A1}$, which are generated in one shots 34 and 32, respectively, upon the occurrence of the leading edge of an $f'$ signal from flip-flop 26, is presented to "and" gate 20 along with the input signal $\overline{f}$. The first occurrence of either the output of AND gate 20 or the signal C1 will reset flip-flop 26, i.e., force a downward going $f'$ pulse. This downward going pulse, when inverted to $\overline{f'}$, initiates activation of one shots 40 and 42.

It is apparent that, when the circuit is first activated, neither AND gates 18 nor 20 can conduct since the $\overline{A}$ and B inputs are generated by one-shots which are initiated by the circuit output signals. Therefore, to generate an $\overline{A}$ and B signal, it is only necessary to ground either the S or R input terminals of flip-flop 26. This may be accomplished manually with a grounded wire and will cause flip-flop 26 to switch and thus one-shots 40, 42 or 32, 34 will become activated to produce the necessary input signals to AND gates 18 or 20.

The AND gate 18 is enabled when $f\cdot\overline{A2}\cdot B2$ are presented to its inputs and produces a signal to OR gate 19 and is illustrated by the graph $B2\cdot A2$ shown in FIGURE 2.

It can be seen in both cases that an "allow change pulse" will begin at $t-\Delta t$ and end at $t+\Delta t$ because of the conditions of all the gates, but should a pulse $f$ ever exceed $t+\Delta t$, which would not present a change to flip-flop 26, a "force pulse" C1 or C2 will be presented to OR gate 19 or 21 and force flip-flop 26 to change; therefore, the pulse width of $f'$ can ever exceed $t+\Delta t$.

The conditions of $\overline{A}\cdot B$ which might be either $\overline{A1}\cdot B1$ or $\overline{A2}\cdot B2$ will cause the pulse $f$ to slow down to generating pulses having a $t$ within a desired range where necessary, and, therefore, are always generating pulses which are $f'\geqq t-\Delta t$ and at the most $t+\Delta t$.

As can be shown by the reference in FIGURE 2, that within a few more pulses than those shown, the signals will regenerate back through themselves and smooth the signals until they all are of equal time durations.

By making one shot multivibrators 32, 34, 40 and 42 adjustable where they can continuously be adjusted so that $\Delta t$ approaches zero, then $f'\equiv t$, and, therefore, by varying these one shots toward zero the ultimate output will be that $n'\equiv n$.

Having thus explained one embodiment of this invention, what is claimed is:

1. A frequency converter for providing the average pulse frequency $f'$ from a previously recorded frequency $f$ comprising:

an $f$ sensing means;

an A generating means being responsive to said $f$ sensing means and having an output$>f$;

a B generating means being responsive to said $f$ sensing means and having an output$<f$;

an inverting means coupled to the output of said A generating means and providing an output $\overline{A}$;

and AND gate being enabled by the output $\overline{A}\cdot B\cdot f$ and having an output path; and a bistable member being responsive to the outputs $\overline{A}\cdot B\cdot f$ of the said AND gate and providing an output signal $f'$.

2. A frequency converter, as defined in claim 1, wherein said $f$ sensing means is read head for sensing previously recorded signals on a dynamic storage device.

3. A frequency converter, as defined in claim 1, and including:

a C generating means being responsive to the output generated by said B generating means; and an OR gate being responsive to the output generated by said C generating means or the output $\overline{A}\cdot B\cdot f$ presented on the output path of said AND gate and providing an output $\overline{A}\cdot B\cdot f\cdot C$.

4. A frequency converter, as defined in claim 2, including:

a recording means responsive to the output signal $f'$ of said bistable member for recording the signal $f'$ upon a dynamic storage device.

5. A frequency converter, as defined in claim 1, wherein said B generating means is a monostable vibrator which has a response time being $>f$; and said A generating means being a monostable vibrator which has a response time being $<f$.

6. A frequency converter, as defined in claim 5, wherein said bistable member is a flip-flop having an input triggerable by the output from said B generating means, the output $\overline{A}$ from said inverting means, and the output from said $f$ sensing means.

7. A frequency converter for providing the average pulse frequency from a previously recorded pulse frequency comprising:

a first pulse generating means having an input path and an output path and being responsive to the previously recorded pulse frequency and generating an output pulse which has a frequency larger than the previously recorded frequency;

a second pulse generating means having an input path and an output path and being responsive to the previously recorded pulse frequency and generating an output pulse which has a frequency smaller than the previously recorded frequency;

an inverting means having an input path and an output path, the input path of said converting means being coupled to the output path of said first pulse generating means and providing an output which is the complement of the pulse generated by said first pulse generating means;

a first gating means being enabled by the output from said inverting means, the output from said second pulse generating means and the previously recorded pulse frequency; and a bistable member having an input means being responsive to the output from said first gating means and providing a signal which is the average recorded frequency of the previously recorded frequency.

8. A frequency converter, as defined in claim 7, and including:

a first forcing pulse generating means having an input path and an output path, said input path being coupled to the output path from said second pulse generating means;

a second gating means being responsive to an output generated by said first forcing pulse generating means, or the output from said first gating means; and said first forcing pulse generating means providing an output which has a frequency larger than the frequency generated by said first pulse generating means.

9. A frequency converter, as set forth in claim 8, including:

a sensing means for sensing a previously recorded pulse frequency from a track of a memory media and having an output path coupled to said first gating means; and a recording means coupled to the output of said bistable member for recording the average pulse frequency on a different track of the memory than that carrying the previously recorded pulse frequency.

10. A frequency converter, as defined in claim 8, including:

a third pulse generating means having an input path and an output path and being responsive to the complement of the previously recorded pulse frequency and generating an output pulse which has a frequency larger than the previously recorded pulse frequency;

a fourth pulse generating means having an input path and an output path and being responsive to the complement of the previously recorded pulse frequency and generating an output pulse which has a frequency smaller than the previously recorded pulse frequency;

an inverting means having an input path and an output path, the input path of said inverting means being coupled to the output path of said third pulse generating means and providing an output which is the complement of the pulse generated by said third pulse generating means; and a third gating means being enabled by the output from said second inverting means, the output from said third pulse generating means being enabled by the output from said second inverting means, the output from said third pulse generating means and the previously recorded pulse frequency; the output of said AND gating means being coupled to the input means of said bistable member and said bistable means alternately enabled by said first gating means and said third gating means.

11. A frequency converter defined in claim 10, including:

a second forcing pulse generating means having an input path and an output path, said input path being coupled to the output path of said fourth pulse generating means;

a fourth gating means being responsive to an output generated by said first forcing pulse generating means for the output from said first gating means;

said second forcing pulse generating means providing an output which has a frequency larger than the frequency generated by said first pulse generating means.

12. A frequency converter, as set forth in claim 11, including:

sensing means for sensing a previously recorded pulse frequency from a track of a dynamic storage device and having a pair of outputs coupled to said first and said third gating means for providing alternate signals to said first and said third gating means; and a recording means coupled to the output of said bistable member for recording the average pulse frequency on a track different than that carrying the previously recorded pulse frequency.

References Cited

UNITED STATES PATENTS

| | | | |
|---|---|---|---|
| 2,789,224 | 4/1957 | Leonard | 340—174.1 X |
| 2,801,407 | 7/1957 | Lubkin | 340—174.1 X |

BERNARD KONICK, Primary Examiner

JOSEPH F. BREIMAYER, Assistant Examiner

U.S. Cl. X.R.

307—265, 269; 340—174.1

PO-1050
(5/69)

UNITED STATES PATENT OFFICE
CERTIFICATE OF CORRECTION

Patent No. 3,473,163 Dated October 14, 1969

Inventor(s) T. A. Conant, Jr.

It is certified that error appears in the above-identified patent and that said Letters Patent are hereby corrected as shown below:

3,473,163
CLOCK TRACK RECORDER
Theodore A. Conant, Jr., Sylmar, Calif., assignor to Singer-General Precision, Inc., a corporation of Delaware
Filed Jan. 20, 1966, Ser. No. 521,783
U.S. Cl. 340-173
12 Claims

SIGNED AND
SEALED
MAY 26 1970

(SEAL)
Attest:

Edward M. Fletcher, Jr.
Attesting Officer

WILLIAM E. SCHUYLER, JR.
Commissioner of Patents